(12) United States Patent
Tsuchiya

(10) Patent No.: US 12,515,871 B2
(45) Date of Patent: Jan. 6, 2026

(54) DOUBLE-WALL CONTAINER, METHOD FOR MANUFACTURING DOUBLE-WALL CONTAINER, AND INVERSION DEVICE

(71) Applicant: NISSEI ASB MACHINE CO., LTD., Nagano (JP)

(72) Inventor: Yoichi Tsuchiya, Nagano (JP)

(73) Assignee: NISSEI ASB MACHINE CO., LTD., Nagano (JP)

( * ) Notice: Subject to any disclaimer, the term of this patent is extended or adjusted under 35 U.S.C. 154(b) by 485 days.

(21) Appl. No.: 17/269,468

(22) PCT Filed: Aug. 15, 2019

(86) PCT No.: PCT/JP2019/032053
§ 371 (c)(1),
(2) Date: Feb. 18, 2021

(87) PCT Pub. No.: WO2020/040036
PCT Pub. Date: Feb. 27, 2020

(65) Prior Publication Data
US 2021/0309443 A1 Oct. 7, 2021

(30) Foreign Application Priority Data

Aug. 22, 2018 (JP) .................................. 2018-155815
Aug. 22, 2018 (JP) .................................. 2018-155816
Sep. 7, 2018 (JP) .................................. 2018-168258

(51) Int. Cl.
*B65D 81/38* (2006.01)
*B29B 11/06* (2006.01)
(Continued)

(52) U.S. Cl.
CPC .......... *B65D 81/3869* (2013.01); *B29B 11/06* (2013.01); *B29C 49/42832* (2022.05);
(Continued)

(58) Field of Classification Search
CPC ...... B65D 81/3869; B65D 2543/00092; B65D 2543/00222; B65D 2543/00574;
(Continued)

(56) References Cited

U.S. PATENT DOCUMENTS 3,357,053 A * 12/1967 Lyon .................. B29C 51/04
264/294
4,035,461 A * 7/1977 Korth .................. B29C 49/0031
264/296
(Continued)

FOREIGN PATENT DOCUMENTS

CN 1461275 A 12/2003
CN 1553873 A 12/2004
(Continued)

OTHER PUBLICATIONS

Definition of outermost, https://www.merriam-webster.com/dictionary/outermost, accessed Jan. 8, 2025 (Year: 2025).*
(Continued)

*Primary Examiner* — Jacob T Minskey
*Assistant Examiner* — Caroline Beha
(74) *Attorney, Agent, or Firm* — Greenblum & Bernstein, P.L.C.

(57) ABSTRACT

A method for manufacturing a double-wall container includes a blow molding process of forming an intermediate molded body by blow molding, the intermediate molded body including a projection part that is provided at a boundary portion between an inner wall forming part and an outer wall forming part and projects outward in a radial direction of the outer wall forming part; an inverting process of pushing the inner wall forming part inside the outer wall forming part and inverting the inner wall forming part, thereby forming the intermediate molded body into the double-wall container; and a collapsing process of collaps- (Continued)

ing the projection part in a depth direction of the intermediate molded body to form a crease at the boundary portion between the inner wall forming part and the outer wall forming part, the collapsing process being performed before the inverting process.

4 Claims, 14 Drawing Sheets

(51) Int. Cl.
  *B29C 49/42* (2006.01)
  *B29C 51/02* (2006.01)
  *B29C 51/08* (2006.01)
  *B29C 51/30* (2006.01)
  *B29K 101/12* (2006.01)
  *B29L 31/00* (2006.01)

(52) U.S. Cl.
  CPC ............ *B29C 51/02* (2013.01); *B29C 51/082* (2013.01); *B29C 51/30* (2013.01); *B29K 2101/12* (2013.01); *B29L 2031/7132* (2013.01)

(58) Field of Classification Search
  CPC ...... B65D 43/0231; B65D 2543/00296; B29B 11/06; B29C 51/02; B29C 571/082; B29C 571/30; B29C 49/4283; B29C 2949/0771; B29C 49/0031; B29C 49/42; B29C 2791/001; B29C 51/325; B29C 57/12; B29C 49/4273; B29C 49/48; B29C 49/64; B29C 2049/4892; B29C 2949/0715; B29C 49/12; B29C 49/06; B29C 69/025; B29C 2049/023; B29K 2101/12; B29L 2031/7132; B29L 2024/00; B29L 2031/716; A47J 41/0077
  See application file for complete search history.

(56) References Cited

U.S. PATENT DOCUMENTS

| | | | |
|---|---|---|---|
| 4,563,325 A * | 1/1986 | Coffman | B29C 67/0029 264/296 |
| 6,887,406 B2 | 5/2005 | Rice et al. | |
| 7,582,249 B2 * | 9/2009 | Iwasaki | B29C 51/08 264/572 |
| 9,339,979 B2 * | 5/2016 | Crawley | B29C 48/13 |
| 2001/0010848 A1 | 8/2001 | Usui et al. | |
| 2003/0026929 A1 | 2/2003 | Usui et al. | |
| 2003/0029876 A1 | 2/2003 | Giraud | |
| 2003/0110822 A1 | 6/2003 | Shimada | |
| 2004/0212120 A1 | 10/2004 | Giraud | |
| 2010/0264203 A1 | 10/2010 | Vesanto et al. | |
| 2019/0261814 A1 * | 8/2019 | Crawley | B29C 49/4273 |
| 2021/0039301 A1 * | 2/2021 | Crawley | A47G 19/2288 |

FOREIGN PATENT DOCUMENTS

| | | |
|---|---|---|
| CN | 1242901 C | 2/2006 |
| CN | 101627882 A | 1/2010 |
| CN | 101918204 A | 12/2010 |
| JP | 39-29325 | 12/1964 |
| JP | 51-75760 A | 6/1976 |
| JP | 58-30969 A | 2/1983 |
| JP | 4-352668 A | 12/1992 |
| JP | 2001-206335 A | 7/2001 |
| JP | 2001-206535 | 7/2001 |
| JP | 2004-123146 A | 4/2004 |
| JP | 2010-52831 A | 3/2010 |
| TW | 370849 | 9/1999 |

OTHER PUBLICATIONS

Office Action issued May 9, 2023 in corresponding family member Japanese application No. 2020-538343 and English language Translation.

Office Action issued in Taiwanese Patent Application No. 108129746 dated Mar. 25, 2022, along with English translation.

International Search Report issued in International Patent Application No. PCT/JP2019/032053, dated Oct. 15, 2019, along with an English translation thereof.

Written Opinion of the International Searching Authority issued in International Application No. PCT/JP2019/032053, dated Oct. 15, 2019, along with an English translation thereof.

Office Action issued in corresponding Taiwanese Patent Application No. 108129746, dated May 5, 2020, along with an English translation thereof.

Office Action issued on Jan. 19, 2023 in family member Chinese patent application No. 201980065202.5 and an English language translation thereof.

* cited by examiner

PART A

PART A

C-C

DOUBLE-WALL CONTAINER, METHOD FOR MANUFACTURING DOUBLE-WALL CONTAINER, AND INVERSION DEVICE

TECHNICAL FIELD

The disclosure relates to a resin double-wall container having a heat insulation (heat retention/cool keeping) effect, a method for manufacturing the double-wall container, and an inversion device.

BACKGROUND ART

Conventionally, a resin container has been widely used as a container for containing various beverages, ice confectionery, and the like. Further, as one of the resin containers, for example, a double-wall container having an inner and outer double-walled structure of an inner wall part and an outer wall part is known. In this double-wall container, a space (air insulation layer) is provided between the inner wall part and the outer wall part. Therefore, the double-wall container is configured to exert the heat retention effect or the cool keeping effect when hot beverages or cold beverages or the like are accommodated.

Generally, such a double-wall container has been manufactured by combining an inner container and an outer container which are separately formed. The double-wall container in which the inner container and the outer container are combined has a relatively high strength, and the heat retention effect and the cool keeping effect thereof are also relatively high. However, there is a drawback that the manufacturing process is complicated.

In recent years, in order to eliminate the complexity of the manufacturing process, a double-wall container formed by deforming a blow-molded intermediate molded body has also been proposed. Specifically, a technique has been proposed in which a double-wall container is formed by manufacturing an intermediate molded body having a shape in which an inner wall forming part corresponding to the inner container is inverted and bulged from an outer wall forming part corresponding to the outer container, and folding (inverting) the inner wall forming part of the intermediate molded body toward an inner side of the outer wall forming part (e.g., see Patent Literatures 1 and 2).

CITATION LIST

Patent Literature

Patent Literature 1: JP-A-S58-30969
Patent Literature 2: JP-A-2004-123146

SUMMARY OF INVENTION

Technical Problem

When the double-wall container is manufactured by forming the intermediate molded body using blow molding and folding (inverting) the inner wall forming part of the intermediate molded body toward an inner side of the outer wall forming part as described above, the manufacturing process of the double-wall container can be simplified, and the manufacturing efficiency is improved.

However, in the double-wall container formed by inverting the inner wall forming part of the intermediate molded body, there is a problem that sufficient strength cannot be ensured and the container is deformed when the container is lifted while a beverage is contained, for example. Specifically, sufficient strength may not be obtained at a boundary portion between the inner wall part and the outer wall part, that is, at an opening edge (drinking mouth) of a recessed portion in which the beverage is contained.

An object of the disclosure is to provide a method for manufacturing a double-wall container and an inversion device which are capable of simplifying the manufacturing process and improving the strength at the opening edge of the recessed portion.

Further, an object of the disclosure is to provide a double-wall container with improved strength at the opening edge of the recessed portion.

Further, since the opening edge is formed at the folded-back portion, it is generally difficult to shape it accurately. For example, a top surface (upper end surface) of the opening edge after being folded-back tends to have an undulating shape (not a flat shape), and the width and thickness in a circumferential direction also tend to be uneven.

Meanwhile, some resin containers are configured so that a lid member closing an opening of a recessed portion can be mounted. For example, a groove portion is provided in an outer peripheral surface or an inner peripheral surface of a cup-shaped container and a projection part corresponding to the groove portion is provided on a lid member. The lid member is fixed to the container by engaging the projection part and the groove portion with each other. It is conceivable to adopt such a structure for the double-wall container.

However, when the double-wall container is provided with the groove portion for mounting the lid member, the strength at the opening edge of the recessed portion may be further insufficient. Further, in the case of forming the double-wall container by folding the inner wall forming part of the intermediate molded body toward the inner side of the outer wall forming part as described above, there is a possibility that it becomes more difficult to accurately shape the opening edge of the recessed portion and wrinkles may be formed when the inner wall forming part is folded back in a state where the groove is formed to the intermediate molded body. Therefore, it is extremely difficult to manufacture, by the above method, a double-wall container provided with an opening edge having sufficient strength and shape accuracy so that the lid member can be satisfactorily mounted.

Another object of the disclosure is to provide a double-wall container capable of ensuring sufficient strength and shape accuracy at the opening edge even when the double-wall container has a structure to which a lid member can be mounted.

Solution to Problem

One aspect of the disclosure to solve the above problem is a method for manufacturing a double-wall container, the double-wall container including: an inner wall part including an inner body portion and an inner bottom portion that form an inner surface of the container; and an outer wall part provided continuously from an upper end of the inner wall part with a gap between the inner wall part and including an outer body portion forming an outer surface of the container, the method including: a blow molding process of forming an intermediate molded body by blow molding, the intermediate molded body including: an outer wall forming part that becomes the outer wall part; an inner wall forming part that becomes the inner wall part and bulges outward in a depth direction of the outer wall forming part; and a projection part that is provided at a boundary portion between the inner wall forming part and the outer wall forming part and projects outward in a radial direction of the outer wall forming part; an inverting process of pushing the inner wall forming part inside the outer wall forming part and inverting the inner wall forming part, thereby forming the intermediate molded body into the double-wall container; and a collapsing process of collapsing the projection part in a depth direction of the intermediate molded body to form a crease at the boundary portion between the inner wall forming part and the outer wall forming part, the collapsing process being performed before the inverting process.

Here, it is preferable that the inverting process is performed in a state where the projection part is collapsed.

Further, it is preferable that, in the collapsing process, the projection part is collapsed in a state where the projection part is adjusted to a predetermined temperature.

Further, the disclosure provides an inversion device used in the above-described method for manufacturing the double-wall container, the inversion device including an accommodating mold having an accommodating recessed portion which opens at one end surface of the accommodating mold and in which the outer wall forming part of the intermediate molded body is accommodated in a state where the projection part projects onto the end surface; an annular pressing mold provided in an annular shape at an opening edge of the accommodating recessed portion, configured to be movable in the depth direction of the intermediate molded body, and pressing the projection part against the end surface of the accommodating mold; and a convex pressing mold configured to be movable in the depth direction of the intermediate molded body, and pressing the inner wall forming part from a bottom portion side thereof to push the inner wall forming part inside the outer wall forming part and invert the inner wall forming part.

Here, it is preferable that the convex pressing mold is configured to be movable in the depth direction of the intermediate molded body in a state where the projection part is collapsed by the annular pressing mold and the accommodating mold.

Further, it is preferable that the inversion device further includes a temperature adjustment device that adjusts the projection part of the intermediate molded body to a predetermined temperature. Furthermore, it is preferable that the temperature adjustment device adjusts the temperature of the annular pressing mold.

Further, one aspect of the disclosure to solve the above problem is a double-wall container including: an inner wall part including an inner body portion and an inner bottom portion that form an inner surface of the container; and an outer wall part provided continuously from an upper end of the inner wall part with a gap between the inner wall part and including an outer body portion forming an outer surface of the container, in which a collapsed portion in which a crease is formed by collapsing the inner wall part and the outer wall part is provided in a circumferential direction at a boundary portion between the inner wall part and the outer wall part, and a gap between the inner wall part and the outer wall part which configure the collapsed portion is narrower than a gap between the inner body portion and the outer body portion.

Here, it is preferable that an inner curved portion curved so as to protrude toward the outer wall part side is formed at a boundary portion between the inner wall part configuring the collapsed portion and the inner body portion, and an outer curved portion curved so as to protrude toward the inner wall part side is formed at a boundary portion between the outer wall part configuring the collapsed portion and the outer body portion, and a gap between the inner curved portion and the outer curved portion is narrower than gaps of other portions of the collapsed portion.

Further, it is preferable that the collapsed portion configures an annular flange portion in which the inner wall part and the outer wall part project to the outer side of the outer body portion. Namely, it is preferable that a collapsed annular flange portion is provided at an opening edge of the double-wall container.

Further, one aspect of the disclosure to solve the above problem is a double-wall container including: an inner wall part including an inner body portion forming an inner surface of a recessed portion that opens on one end side thereof; and an outer wall part provided continuously from the inner wall part with a gap between the inner wall part and including an outer body portion forming an outer surface of the container, in which an end portion, on the opening side, of one of the inner wall part and the outer wall part has a mounting portion to which a lid member covering the opening is to be mounted, and the mounting portion is provided with a plurality of engagement grooves with which a plurality of protrusions of the lid member are to be engaged, and a reinforcing portion for reinforcing the mounting portion is provided along a circumferential direction at a boundary portion between the inner wall part and the outer wall part.

In such a double-wall container of the disclosure, the strength of the mounting portion is improved by the reinforcing portion provided along the circumferential direction of the container. Therefore, even when the engagement groove with which the protrusion of the lid member engages is formed to the mounting portion, the deformation of the mounting portion is suppressed. That is, even when the engagement groove is formed in the mounting portion, the deformation of the container at the opening edge is suppressed.

Here, it is preferable that the mounting portion is provided with a guiding groove that extends from the end portion, on the opening side, toward the engagement groove and guides the engagement convex portion to the engagement groove, and the reinforcing portion has a reinforcing rib that is provided on an end portion, on the opening side, of the guiding groove to project from a bottom surface of the guiding groove and has a height lower than the surface of the mounting portion. In this way, the strength of the container at the opening edge can be more effectively improved.

Further, it is preferable that the inner wall part and the outer wall part are connected via a connecting portion forming an end surface on the opening side, and the reinforcing portion has an annular rib that is provided to project to a position spaced away from an end portion of the connecting portion on the side of the mounting portion and is continuous in a circumferential direction. In this way, the strength of the container at the opening edge can be more effectively improved.

Furthermore, preferably, an angle of a corner formed by a side surface of the annular rib and a surface of the connecting portion is an acute angle. In this way, the strength of the container at the opening edge can be more effectively improved.

Further, it is preferable that the mounting portion is provided to the inner wall part, and the reinforcing portion has an annular flange portion which is provided at a boundary portion between the inner wall part and the outer wall part and in which the inner wall part and the outer wall part project outward from the outer body portion configuring the outer wall part. In this way, the strength of the container at the opening edge can be more effectively improved.

Furthermore, it is preferable that the annular flange portion is formed by collapsing the inner wall part and the outer wall part to form a crease, and a gap between the inner wall part and the outer wall part which configure the annular flange portion is narrower than a gap between the inner body portion and the outer body portion. In this way, the strength of the container at the opening edge can be more effectively improved.

Advantageous Effects of Invention

According to the method for manufacturing the double-wall container of the disclosure, the double-wall container in which the crease is formed at the boundary portion between the inner wall part and the outer wall part, that is, the double-wall container in which the collapsed portion is formed at the opening edge of the recessed portion by collapsing the inner wall part and the inner wall part can be relatively easily manufactured. Further, the strength of the double-wall container can be increased by providing the collapsed portion at the opening edge of the recessed portion. Namely, according to the method for manufacturing the double wall container of the disclosure, the double-wall container with improved strength at the opening edge of the recessed portion can be relatively easily manufactured.

According to the double-wall container of the disclosure, the collapsed portion is provided at the opening edge of the recessed portion, so that the strength of the double-wall container can be increased. In particular, the annular flange portion is provided at the opening edge of the recessed portion, and the annular flange portion is configured by the collapsed portion, so that the strength of the double-wall container can be further increased. In this way, the deformation of the double-wall container is suppressed even when a beverage or the like is contained in the double-wall container, for example.

Further, according to the double-wall container of the disclosure, even when the container is configured so that the lid member can be mounted, the strength of the container at the opening edge can be improved by providing the reinforcing portion. That is, sufficient strength of the double-wall container can be ensured by the reinforcing portion. Therefore, even when a beverage or the like is contained in the double-wall container, the deformation of the container is suppressed, and the lid member can be mounted thereto.

DESCRIPTION OF EMBODIMENTS

Hereinafter, examples of embodiments will be described in detail with reference to the drawings.

First Embodiment

Figure 1:
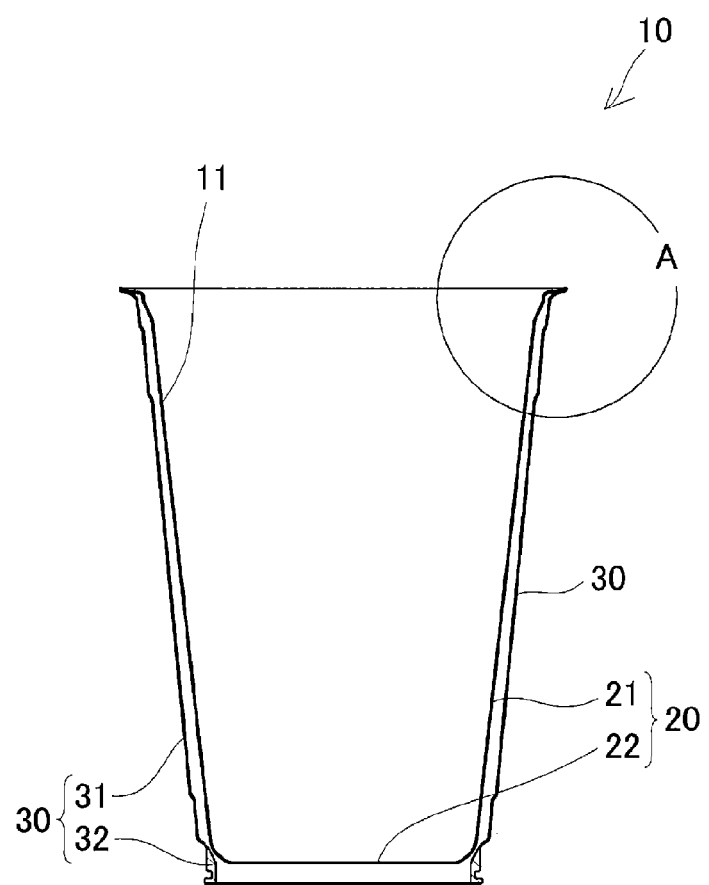
FIG. 1 is a sectional view showing a double-wall container according to a first embodiment of the disclosure.
Figure 2:
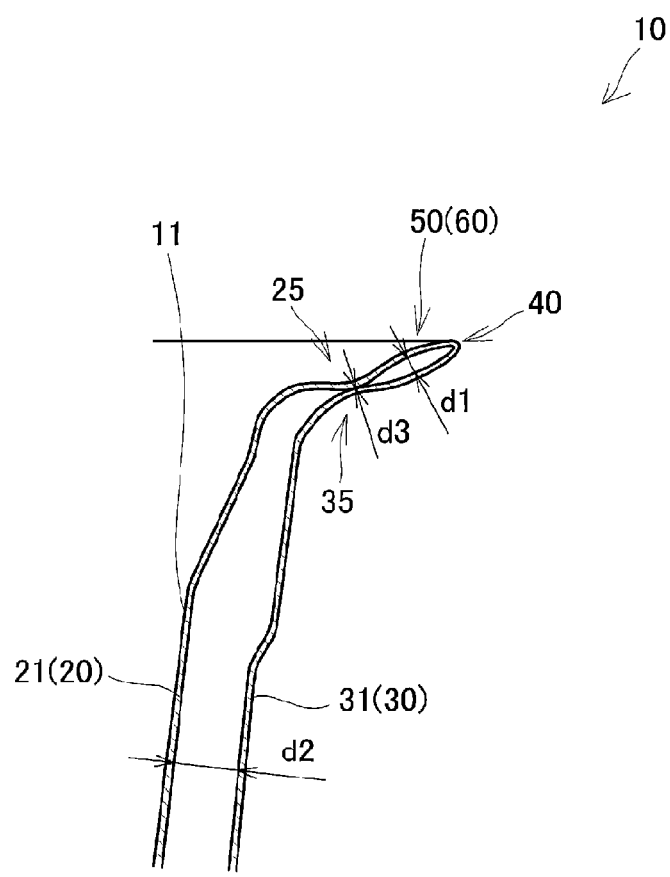
FIG. 2 is an enlarged sectional view of the double-wall container according to the first embodiment of the disclosure.
Figure 3A:
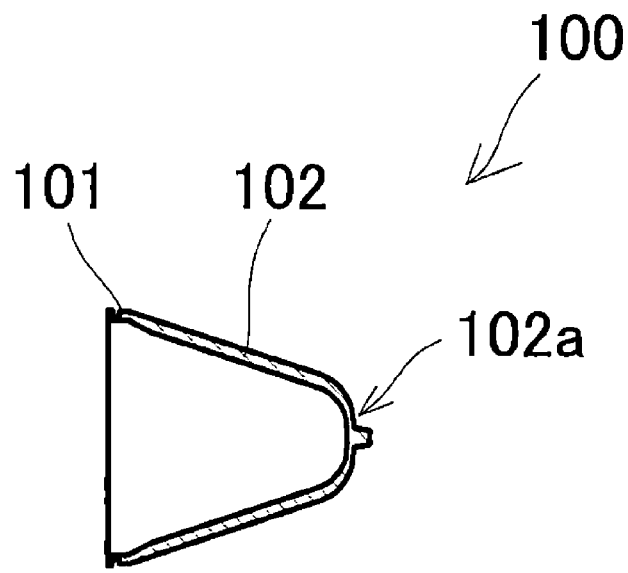
FIG. 3A is a view for explaining a method for manufacturing the double-wall container according to the first embodiment of the disclosure.
Figure 3B:
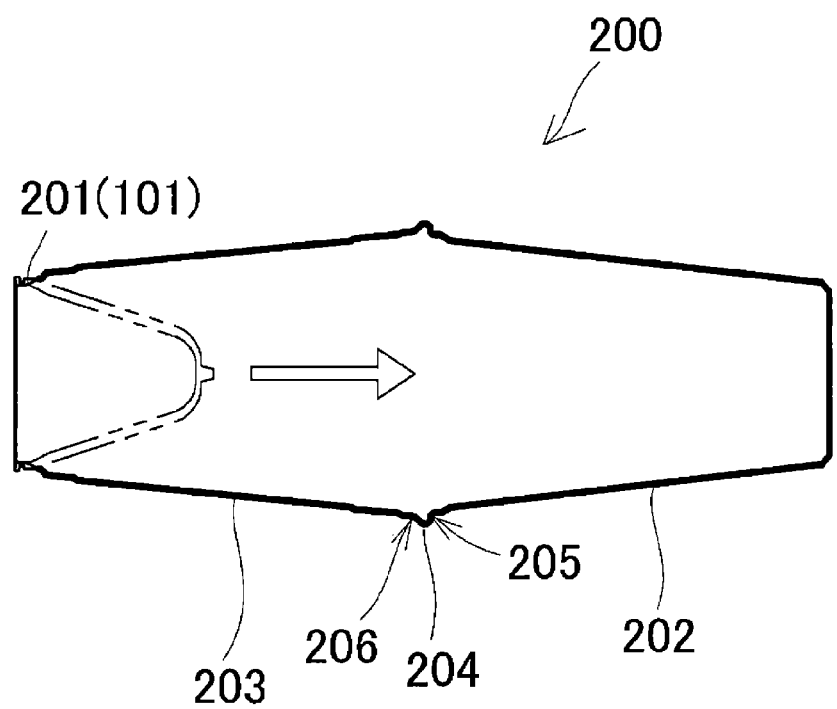
FIG. 3B is a view for explaining the method for manufacturing the double-wall container according to the first embodiment of the disclosure.
Figure 4:
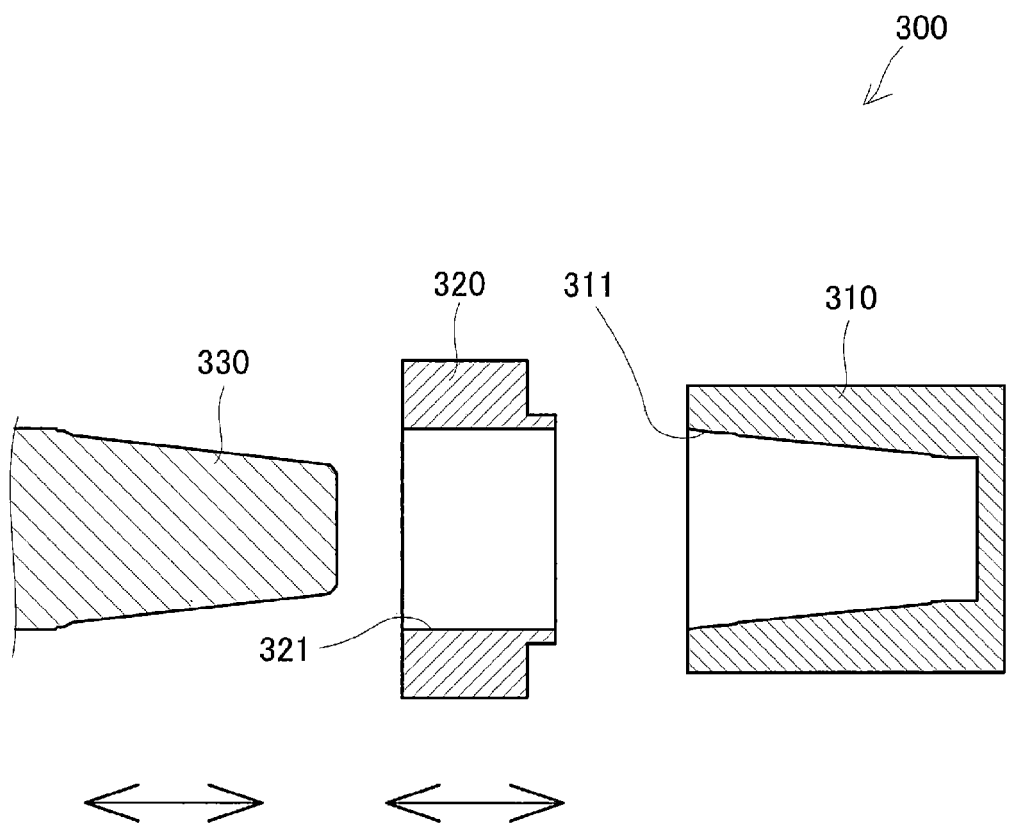
FIG. 4 is a view for explaining a schematic configuration of an inversion device according to the first embodiment of the disclosure.

FIG. 1 is a sectional view showing a double-wall container according to a first embodiment of the disclosure. FIG. 2 is an enlarged sectional view showing a part A in FIG. 1. Further, FIGS. 3A and 3B are views for explaining a method for manufacturing the double-wall container according to the first embodiment of the disclosure. FIG. 4 is a view for explaining a schematic configuration of an inversion device according to the first embodiment of the disclosure.

Figure 5A:
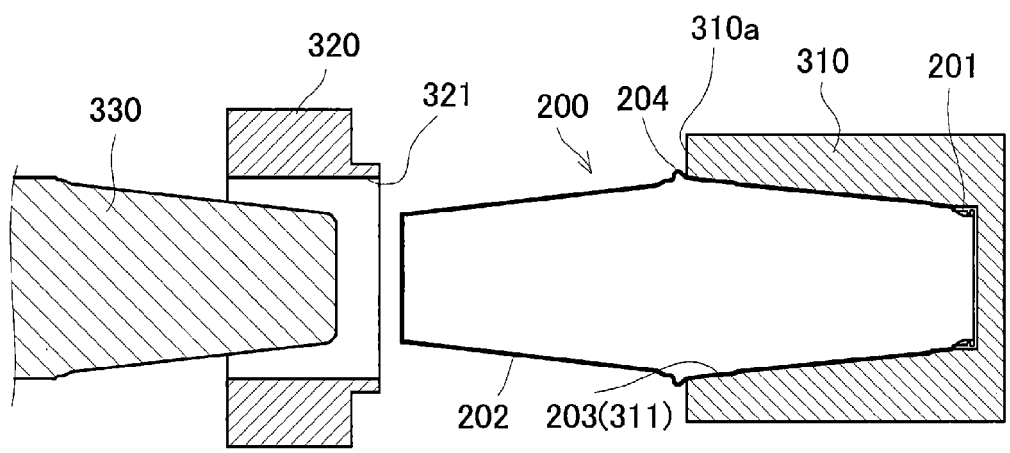
FIG. 5A is a view for explaining the method for manufacturing the double-wall container according to the first embodiment of the disclosure.
Figure 5B:
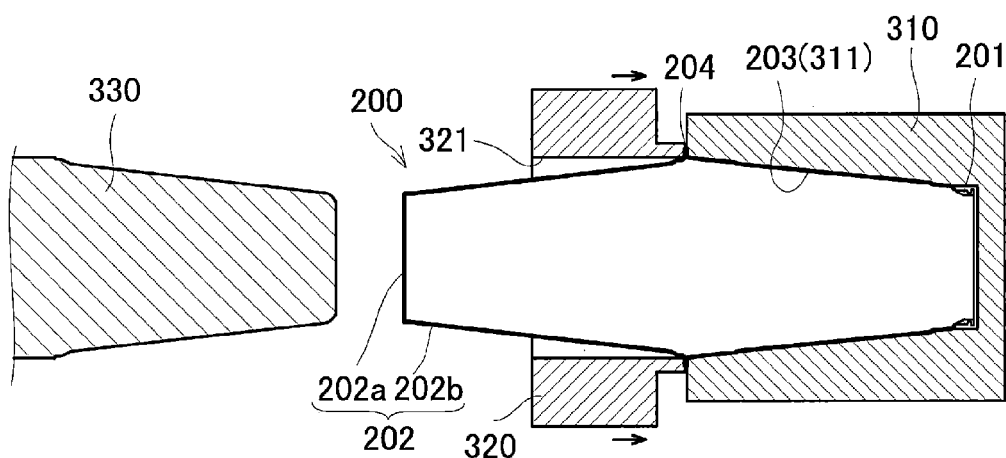
FIG. 5B is a view for explaining the method for manufacturing the double-wall container according to the first embodiment of the disclosure.
Figure 5C:
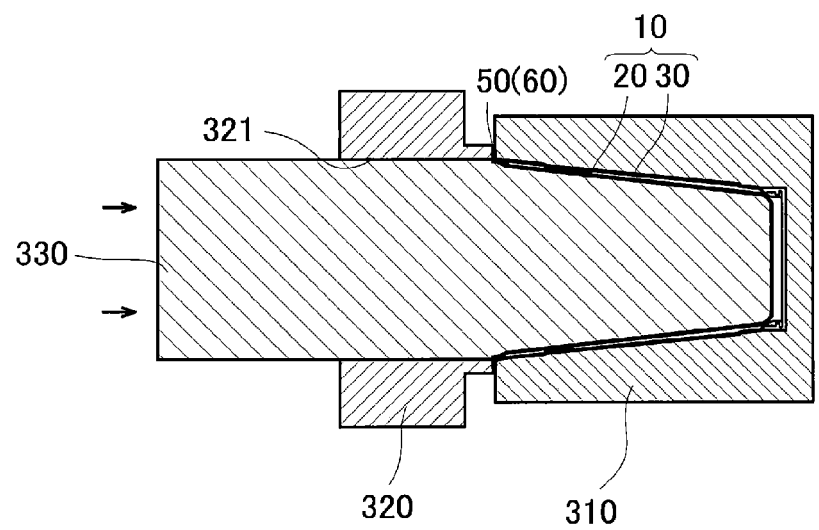
FIG. 5C is a view for explaining the method for manufacturing the double-wall container according to the first embodiment of the disclosure.

Further, FIGS. 5A to 5C are views for explaining the method for manufacturing the double-wall container according to the first embodiment of the disclosure, and in particular, for explaining a collapsing process and an inverting process.

As shown in FIG. 1, a double-wall container (hereinafter, also simply referred to as a container) 10 according to the present embodiment is a cup-shaped resin container that includes a recessed portion 11 for containing a beverage or the like. The container 10 includes a double-wall portion of an inner wall part 20 forming an inner surface of the container 10 (an inner surface of the recessed portion 11) and an outer wall part 30 forming an outer surface of the container 10. The inner wall part 20 and the outer wall part 30 are provided at a predetermined interval to exert a heat insulation effect.

The material of the double-wall container 10 is not particularly limited, but for example, synthetic resins such as polypropylene (PP), polyethylene (PE), polyethylene terephthalate (PET), and biodegradable plastic are preferably used.

The inner wall part 20 has an inner body portion 21 forming an inner peripheral surface of a body portion of the container 10, and an inner bottom portion 22 provided continuously from the inner body portion 21 and forming a bottom portion of the container 10.

Meanwhile, the outer wall part 30 is provided continuously from an upper end of the inner wall part 20. As described above, a gap is formed between the outer wall part 30 and the inner wall part 20. In the present embodiment, the outer wall part 30 has an outer body portion 31 forming an outer peripheral surface of the body portion of the container 10, and a single cylinder-shaped leg portion 32 provided continuously from the outer body portion 31. That is, a lower end side of the outer wall part 30 is opened, and the short cylinder-shaped leg portion 32 is provided at an edge of the opening.

When placing the double-wall container 10, the leg portion 32 comes into contact with the placement surface to close the opening, and a space is also formed between the bottom portion of the double-wall container 10 (the inner bottom portion 22) and the placement surface. In this way, the heat insulation effect (heat retention effect and cool keeping effect) of the container 10 is further enhanced.

Here, as shown in the enlarged view of the part A of FIG. 2, at an opening edge portion (a drinking mouth) of the recessed portion 11 of the cup-shaped container 10, a collapsed portion 50 in which a crease 40 is formed at an boundary portion between the inner wall part 20 and the outer wall part 30 by collapsing the inner wall part 20 and the outer wall part 30 is formed in a circumferential direction of the container 10.

Further, in the present embodiment, the inner wall part 20 and the outer wall part 30 are provided at the opening edge portion of the recessed portion 11 to project to the outer side of the outer body portion 31. That is, an annular flange portion 60 projecting to the outer side of the outer body portion 31 is provided at the opening edge portion of the recessed portion 11. The annular flange portion 60 is configured by the collapsed portion 50.

A gap (maximum value) d1 between the inner wall part 20 and the outer wall part 30 configuring the collapsed portion 50 (the annular flange portion 60) is narrower than a gap (maximum value) d2 between the inner wall part 20 (the inner body portion 21) and the outer wall part 30 (the outer body portion 31) forming a peripheral surface of the container 10.

The strength of the container 10 is increased by providing the collapsed portion 50 at the opening edge portion of the recessed portion 11. Therefore, for example, even when a beverage or the like is contained in the container 10, the deformation of the container 10 is suppressed. Further, in the present embodiment, the annular flange portion 60 is provided at the opening edge portion of the recessed portion 11, and the annular flange portion 60 is configured by the collapsed portion 50, so that the strength of the container 10 is further increased.

Further, an inner curved portion 25 curved so as to protrude toward the outer wall part 30 side is formed at a boundary portion between the inner wall part 20 configuring the collapsed portion 50 (the annular flange portion 60) and the inner body portion 21. On the other hand, an outer curved portion 35 curved so as to protrude toward the inner wall part 20 side is formed at a boundary portion between the outer wall part 30 configuring the collapsed portion 50 (the annular flange portion 60) and the outer body portion 31.

Further, a gap d3 between the inner curved portion 25 and the outer curved portion 35 is narrower than gaps of other portions of the collapsed portion 50. In this way, the strength of the container 10 is more reliably increased.

The method for manufacturing the double-wall container 10 having such a shape is not particularly limited, but the double-wall container 10 can be manufactured, for example, by the method described below. By manufacturing the double-wall container 10 with this method, the manufacturing process of the double-wall container 10 can be simplified, and the manufacturing efficiency can be improved.

Specifically, first, a predetermined preform is injection-molded by an injecting molding apparatus, and then, the preform is blown-molded by a blow molding apparatus to form an intermediate molded body.

First, as shown in FIG. 3A, a preform 100 having a predetermined shape is formed by injection molding (injection molding process). The preform 100 has a neck portion 101, and a bottomed body portion 102 continuous from the neck portion 101. The neck portion 101 is a portion that becomes the leg portion 32 of the double-wall container 10. Therefore, the neck portion 101 is formed to have substantially the same shape (thickness, height, opening diameter, etc.) as the leg portion 32.

The shape of the body portion 102 of the preform 100 is not particularly limited. However, in the present embodiment, the body portion 102 is relatively short and small, and is formed in a substantially tapered shape (a so-called bowl shape). That is, the body portion 102 of the preform 100 is formed so that the diameter at an end portion on the side of the neck portion 101 is the largest and the diameter becomes smaller toward a bottom surface portion 102*a* of the body portion 102.

Subsequently, the preform 100 is conveyed from the injection molding apparatus to the blow molding apparatus. When the body portion 102 of the preform 100 is blow-molded in a mold, an intermediate molded body 200 having a predetermined shape is formed as shown in FIG. 3B (blow molding process). The intermediate molded body 200 includes a neck portion 201 that becomes the leg portion 32 of the container 10, an inner wall forming part 202 that becomes the inner wall part 20 (the inner body portion 21 and the inner bottom portion 22) of the container 10, and an outer wall forming part 203 that becomes the outer wall part 30 (outer body portion 31) of the container 10. The neck portion 201 of the intermediate molded body 200 is a portion common to the neck portion 101 of the preform 100.

The outer wall forming part 203 is formed continuously from the neck portion 201, and the inner wall forming part 202 is formed continuously on the side of the outer wall forming part 203 opposite to the neck portion 201. That is, the inner wall forming part 202 is formed in a shape that bulges outward in a depth direction (a left and right direction in FIGS. 3A and 3B) of the outer wall forming part 203. Namely, the intermediate molded body 200 has a shape in which the inner wall part 20 of the container 10 is inverted outward on the side of the outer wall part 30 opposite to the leg portion 32.

Further, in the present embodiment, at the boundary portion between the inner wall forming part 202 and the outer wall forming part 203 (the portion corresponding to the opening edge portion of the recessed portion 11 of the container 10), a projection part 204 projecting outward in a radial direction of the outer wall forming part 203 is provided in the circumferential direction. That is, the inner wall forming part 202 and the outer wall forming part 203 are connected via the projection part 204. The projection part 204 is a portion that becomes the collapsed portion 50 (the annular flange portion 60) of the container 10. Therefore, the projection part 204 is formed in a shape (projecting amount) that matches the collapsed portion 50 (the annular flange portion 60).

Furthermore, a first curved portion 205 that becomes the inner curved portion 25 of the container 10 is formed at the boundary portion between the projection part 204 and the inner wall forming part 202. A second curved portion 206 that becomes the outer curved portion 35 of the container 10 is formed at the boundary portion between the projection part 204 and the outer wall forming part 203. The first curved portion 205 and the second curved portion 206 are formed in curved surfaces that protrude toward the inside of the intermediate molded body 200.

After such an intermediate molded body 200 is formed, the intermediate molded body 200 is conveyed from the blow molding apparatus to an inversion device, and the inner wall forming part 202 is pressed and inverted by the inversion device. In this way, the double-wall container 10 as a final product is formed (inverting process).

Here, as shown in FIG. 4, an inversion device 300 according to the present embodiment includes an accommodating mold 310, an annular pressing mold 320, and a convex pressing mold 330. The accommodating mold 310 has an accommodating recessed portion 311. The accommodating recessed portion 311 is provided to open at one end surface of the accommodating mold 310. The outer wall forming part 203 and the neck portion 201 of the intermediate molded body 200 are accommodated in the accommodating recessed portion 311.

The annular pressing mold 320 is provided for collapsing the projection part 204 of the intermediate molded body 200 with the accommodating mold 310 as described later.

The annular pressing mold 320 is provided in an annular shape to face an opening peripheral edge of the accommodating recessed portion 311. Further, a through hole 321 is formed in the portion of the annular pressing mold 320 facing the accommodating recessed portion 311. The annular pressing mold 320 is configured to be movable in a depth direction of the intermediate molded body 200 (the left and right direction in FIG. 4). That is, the annular pressing mold 320 is configured to be movable in a direction approaching or away from the accommodating mold 310.

The convex pressing mold 330 is provided for pressing and inverting the inner wall forming part 202. In other words, the convex pressing mold 330 is a mold for forming the recessed portion 11 of the container 10. Similar to the annular pressing mold 320, the convex pressing mold 330 is configured to be movable in the depth direction of the intermediate molded body 200 (the left and right direction in FIG. 4). More specifically, the convex pressing mold 330 is configured to be inserted into the accommodating recessed portion 311 through the through hole 321 of the annular pressing mold 320.

Further, in the present embodiment, the convex pressing mold 330 is configured to be movable in the depth direction of the intermediate molded body 200 (the left and right direction in FIG. 4) in a state where the projection part 204 is collapsed by the annular pressing mold 320 and the accommodating mold 310 as described later.

In the present embodiment, the inner wall forming part 202 of the intermediate molded body 200 is inverted by the inversion device 300 having such a configuration, thereby forming the double-wall container 10 as a final product.

First, as shown in FIG. 5A, the outer wall forming part 203 and the neck portion 201 of the intermediate molded body 200 are accommodated in the accommodating recessed portion 311 of the accommodating mold 310. At this time, the projection part 204 is in a state of projecting onto an end surface 310a of the opening peripheral edge of the accommodating mold 310.

In this state, as shown in FIG. 5B, the annular pressing mold 320 is moved toward the accommodating mold 310, and the projection part 204 of the intermediate molded body 200 is collapsed by the annular pressing mold 320 and the accommodating mold 310 (collapsing process).

In this way, the collapsed portion 50 (the annular flange portion 60) of the container 10 is formed. Further, since the first curved portion 205 and the second curved portion 206 are formed on the projection part 204 as described above, the gap between the inner wall part 20 and the outer wall part 30 configuring the collapsed portion 50 can be made relatively narrower.

At that time, the projection part 204 is preferably collapsed while being heated to a predetermined temperature (100° C. to 140° C.). That is, the inversion device 300 preferably includes a temperature adjustment device that adjusts the projection part 204 of the intermediate molded body 200 to a predetermined temperature.

For example, the annular pressing mold 320 is provided with a supply line (not shown) for supplying a temperature adjustment medium such as hot water or oil. The temperature (surface temperature) of the annular pressing mold 320 can be adjusted by supplying the temperature adjustment medium into the supply line using a supply device (temperature adjustment device).

In a state where the annular pressing mold 320 whose surface temperature has been adjusted is brought into contact with the projection part 204, and the projection part 204 is raised to a predetermined temperature, the projection part 204 is collapsed by the annular pressing mold 320 and the accommodating mold 310.

The configuration of the temperature adjustment device is not particularly limited. For example, the temperature adjustment device may be a heater that heats the annular pressing mold 320 or a heater that heats the projection part 204 itself.

Subsequently, while maintaining the state in which the projection part 204 is collapsed by the annular pressing mold 320 and the accommodating mold 310, as shown in FIG. 5C, the convex pressing mold 330 is moved toward the accommodating mold 310, and the inner wall forming part 202 is pushed inside the accommodating recessed portion 311 and is inverted. Namely, the inner wall forming part 202 is pushed inside the outer wall forming part 203 and is inverted (inverting process).

Specifically, when the convex pressing mold 330 is moved toward the accommodating mold 310, a tip surface of the convex pressing mold 330 comes into contact with a bottom portion 202a of the inner wall forming part 202. As the bottom portion 202a is pressed, a body portion 202b of the inner wall forming part 202 is deformed (inverted) and pushed inside the outer wall forming part 203. In this way, the double-wall container 10 is formed (see FIG. 1).

When the inner wall forming part 202 is inverted by the convex pressing mold 330, the inner wall forming part 202 may be adjusted to a predetermined temperature. For example, the inversion device 300 may include a temperature adjustment device such as a heater that heats the inner wall forming part 202. Here, when the inner wall forming part 202 is heated, it is preferable that the body portion 202b of the inner wall forming part 202 is heated and the bottom portion 202a with which the convex pressing mold 330 is in contact is not heated as much as possible. In this way, the inner wall forming part 202 can be appropriately pressed by the convex pressing mold 330, and the inner wall forming part 202 can be satisfactorily inverted.

When the double-wall container 10 is manufactured by such a manufacturing method of the present embodiment, that is, when the intermediate molded body 200 is inverted by the inversion device 300 to manufacture the double-wall container 10, the manufacturing process of the double-wall container 10 can be simplified. Therefore, the manufacturing efficiency of the double-wall container 10 can be improved.

Further, in the above manufacturing method, the leg portion 32 of the double-wall container 10 is formed by injection molding, and the other portions are formed by blow molding. Therefore, the leg portion 32 is formed to be thicker than the other portions. In this way, it is possible to improve the stability when the double-wall container 10 is placed.

Further, for example, although, in the above embodiment, the inverting process is performed in a state where the projection part 204 of the intermediate molded body 200 is collapsed, the inverting process may be performed in a state where the collapsing of the projection part 204 is released. Namely, if the projection part 204 is sufficiently collapsed, the projection part 204 does not necessarily have to be in the collapsed state when the inverting process is performed.

Second Embodiment

Figure 6:
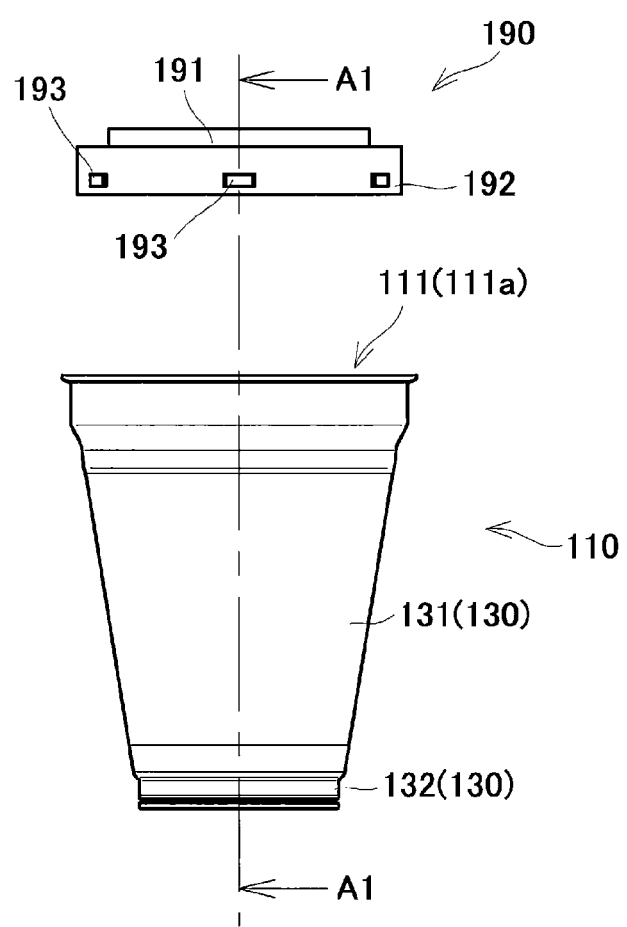
FIG. 6 is a front view of a double-wall container and a lid member according to a second embodiment of the disclosure.
Figure 7:
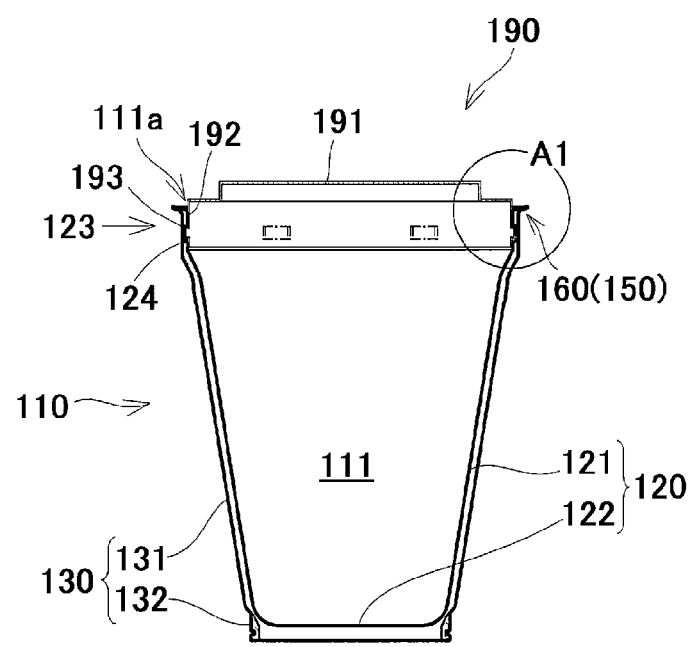
FIG. 7 is a sectional view of the double-wall container and the lid member according to the second embodiment of the disclosure.
Figure 8:
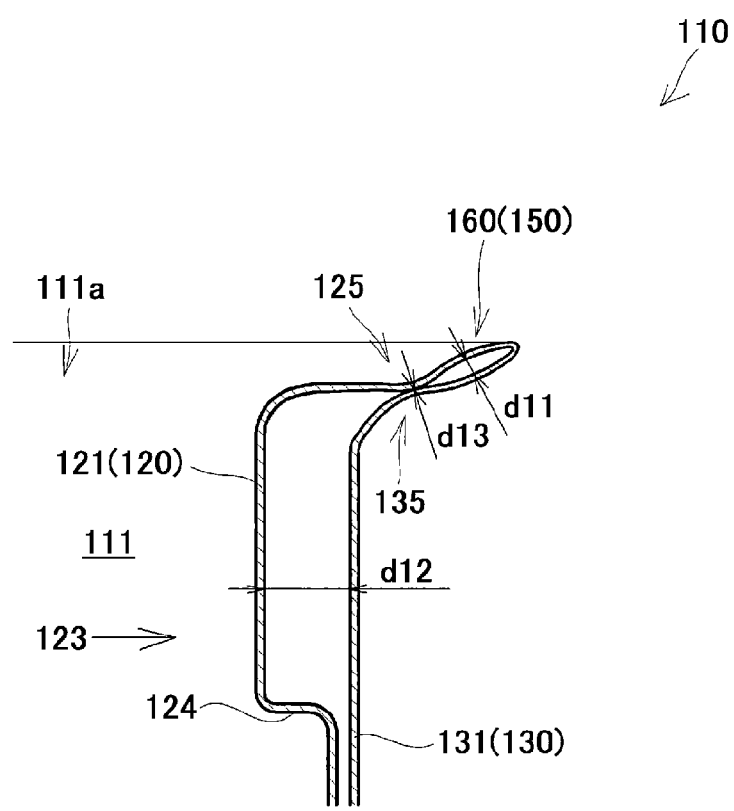
FIG. 8 is an enlarged sectional view of the double-wall container according to the second embodiment of the disclosure.
Figure 9A:
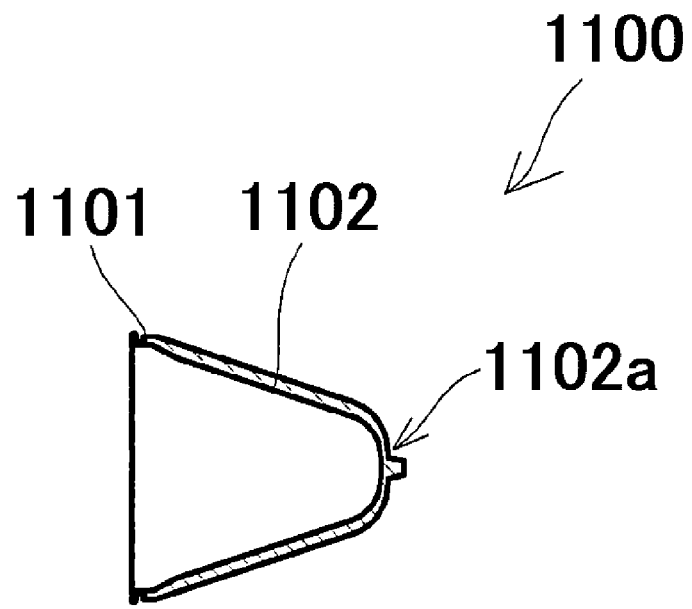
FIG. 9A is a view for explaining a method for manufacturing the double-wall container according to the second embodiment of the disclosure.
Figure 9B:
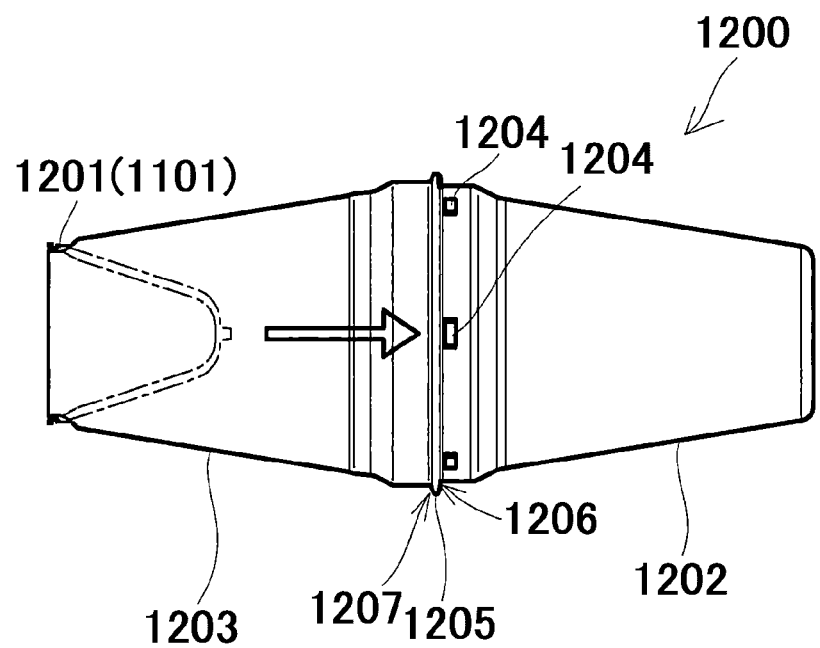
FIG. 9B is a view for explaining the method for manufacturing the double-wall container according to the second embodiment of the disclosure.
Figure 10:
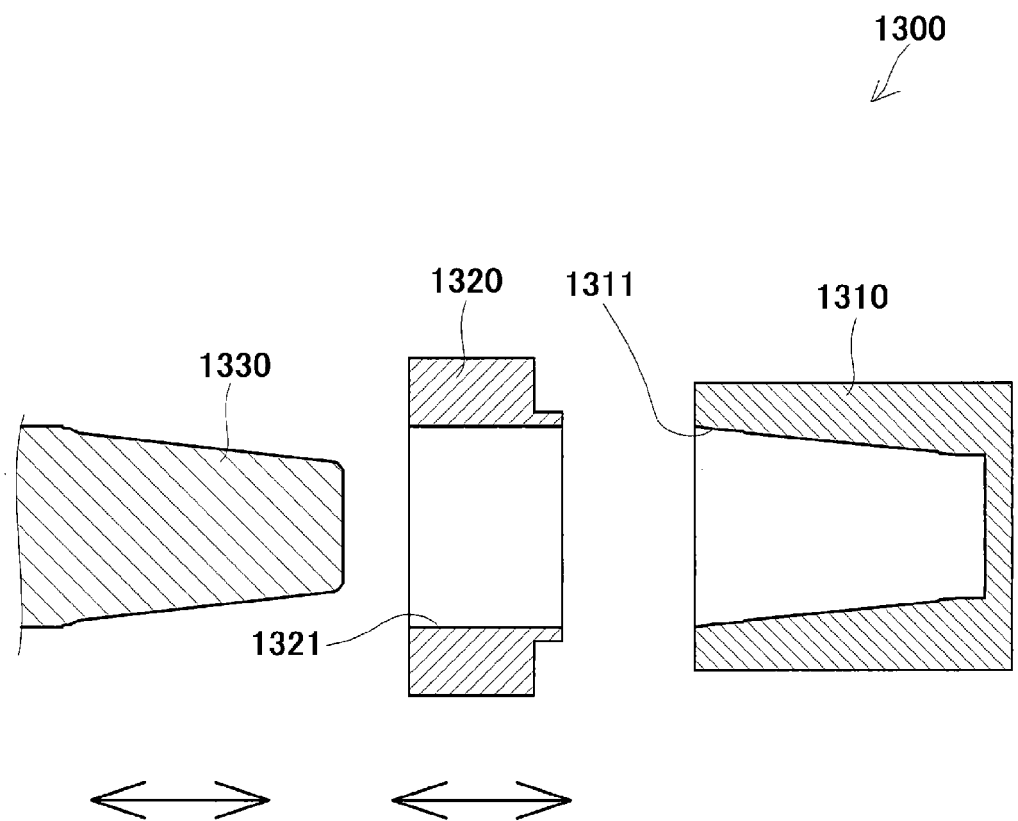
FIG. 10 is a view for explaining a schematic configuration of an inversion device according to the second embodiment of the disclosure.
Figure 11A:
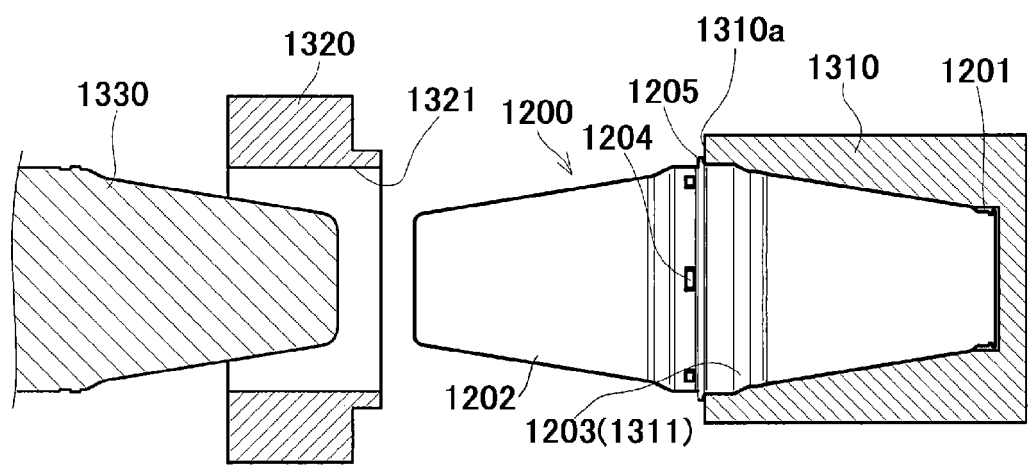
FIG. 11A is a view for explaining the method for manufacturing the double-wall container according to the second embodiment of the disclosure.
Figure 11B:
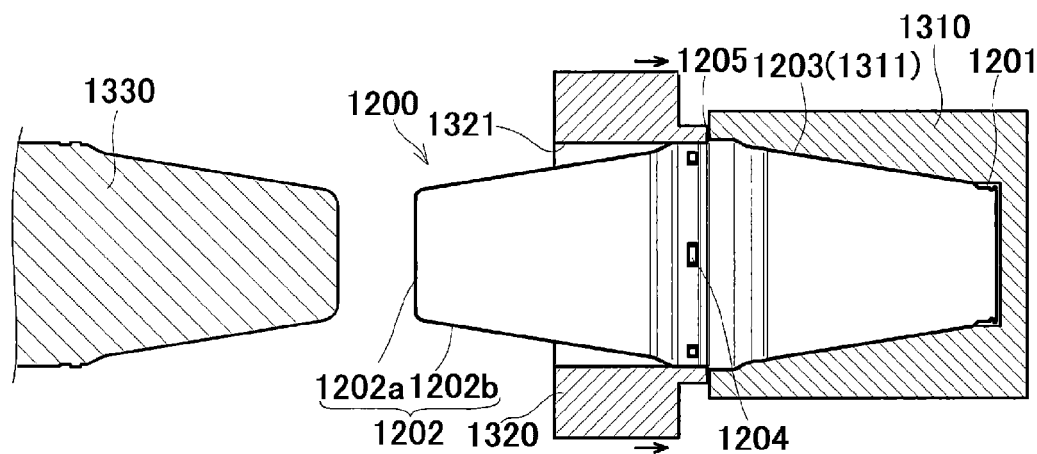
FIG. 11B is a view for explaining the method for manufacturing the double-wall container according to the second embodiment of the disclosure.
Figure 11C:
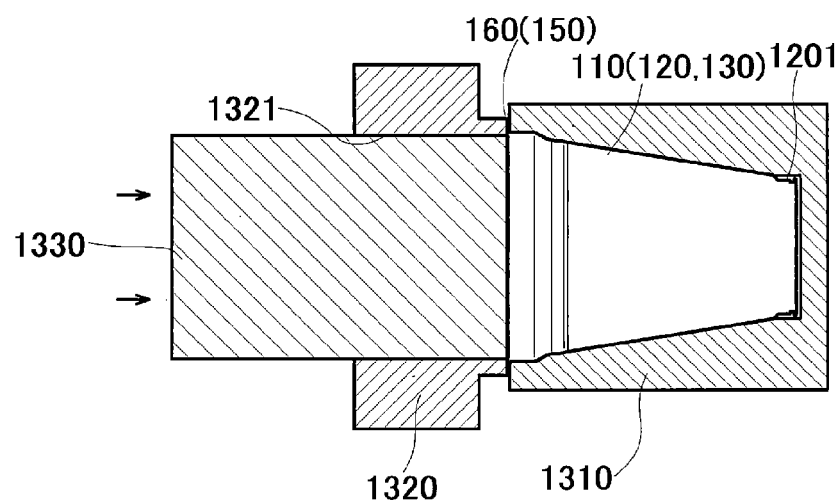
FIG. 11C is a view for explaining the method for manufacturing the double-wall container according to the second embodiment of the disclosure.

FIGS. 6 and 7 are views showing a double-wall container and a lid member according to a second embodiment of the disclosure. FIG. 6 is a front view showing a state in which the lid member is removed from the double-wall container. Further, FIG. 7 is a view showing a state in which the lid member is mounted to the double-wall container. FIG. 7 is a sectional view of the portion corresponding to the line A1-A1 of FIG. 6. FIG. 8 is an enlarged sectional view showing the part A1 of FIG. 7. Further, FIGS. 9A and 9B are views for explaining the method for manufacturing the double-wall container according to the second embodiment of the disclosure. FIG. 10 is a view for explaining a schematic configuration of an inversion device according to the second embodiment of the disclosure. FIGS. 11A to 11C are views for explaining the method for manufacturing the double-wall container according to the second embodiment of the disclosure, in particular, for explaining a collapsing process and an inverting process.

As shown in FIGS. 6 and 7, a double-wall container (hereinafter, also simply referred to as a container) 110 according to the present embodiment is a cup-shaped resin container that includes a recessed portion 110 for containing a beverage or the like. The container 110 includes an inner wall part 120 forming an inner surface of the container 110 (an inner surface of the recessed portion 11) that opens at one end side, and an outer wall part 130 forming an outer surface of the container 110. That is, the container 110 includes a double wall portion. The inner wall part 120 and the outer wall part 130 are provided at a predetermined interval to exert a heat insulation effect.

The material of the double-wall container 110 may be the same as the material of the double-wall container 10 according to the first embodiment.

The inner wall part 120 has an inner body portion 121 forming an inner peripheral surface of the recessed portion 111 of the container 110, and an inner bottom portion 122 provided continuously from the inner body portion 121 and forming a bottom portion of the container 110.

On the other hand, the outer wall part 130 is provided continuously from an upper end of the inner wall part 120. As described above, a gap is formed between the outer wall part 130 and the inner wall part 120. In the present embodiment, the outer wall part 130 has an outer body portion 131 forming an outer peripheral surface of the body portion of the container 110, and a single cylinder-shaped leg portion 132 provided continuously from the outer body portion 131. That is, a lower end side of the outer wall part 130 is opened, and the short cylinder-shaped leg portion 132 is provided at a peripheral edge of the opening.

When the double-wall container 110 is placed, the leg portion 132 comes into contact with the placement surface to close the opening, and a space is also formed between the bottom portion of the double-wall container 110 (the inner bottom portion 122) and the placement surface. In this way, the heat insulation effect (heat retention effect and cool keeping effect) of the container 110 is further enhanced.

Further, the double-wall container 110 is configured so that a lid member 190 covering an opening 111a of the recessed portion 111 can be mounted. In the present embodiment, the double-wall container 110 is configured so that the lid member 190 can be mounted to an inner peripheral surface side. Specifically, the inner body portion 121 of the inner wall part 120 is provided, at an end portion on the side of the opening 111a, with a mounting portion 123 to which the lid member 190 is mounted. The mounting portion 123 is a portion with which the lid member 190 slides into contact when mounted to the double-wall container 110. The mounting portion 123 is formed in a substantially flat surface in an upper and lower direction of the container 110. Further, a plurality of (e.g., six) engagement grooves 124 for fixing the lid member 190 to the container 110 are formed in the mounting portion 123 at predetermined intervals in the circumferential direction.

The lid member 190 is a so-called inner lid that is mounted into the recessed portion 111 of the double-wall container 110. The lid member 190 includes a lid body 191 facing the opening 111a, and an annular vertical wall portion 192 provided on an outer peripheral portion of the lid body 191 and facing the mounting portion 123. The vertical wall portion 192 is provided with a plurality of engagement convex portions 193 projecting toward each engagement groove 124. The lid member 190 is fixed to the container 110 by engaging the plurality of engagement convex portions 193 with the engagement grooves 124.

Furthermore, the double-wall container 110 is provided with a reinforcing portion 150 for reinforcing the mounting portion 123 along the circumferential direction at a boundary portion between the inner wall part 120 and the outer wall part 130. In the present embodiment, an annular flange portion 160 in which the inner wall part 120 and the outer wall part 130 project outward from the outer body portion 131 is provided on the peripheral edge of the opening 111*a* of the recessed portion 111. The annular flange portion 160 functions as the reinforcing portion 150.

Here, the annular flange portion 160 is formed by collapsing the inner wall part 120 and the outer wall part 130 to form a crease at the boundary portion between the inner wall part 120 and the outer wall part 130. As shown in FIG. 8, a gap (maximum value) d11 between the inner wall part 120 and the outer wall part 130 configuring the annular flange portion 160 is narrower than a gap (maximum value) d12 between the inner wall part 120 (the inner body portion 121) and the outer wall part 130 (the outer body portion131) forming the mounting portion 123.

Since the reinforcing portion 150 configured by such an annular flange portion 160 is provided on the peripheral edge of the opening 111*a*, the strength of the container 110, in particular, the strength in the vicinity of the mounting portion 123 is increased. Therefore, even when a plurality of engagement grooves 124 are formed in the mounting portion 123, sufficient strength is ensured in the vicinity of the mounting portion 123 including the peripheral edge of the opening 111*a*. As a result, for example, even when the container 110 is gripped while a beverage or the like is contained in the container 110, the deformation of the container 110 suppressed.

Further, in the present embodiment, the annular flange portion 160 configuring the reinforcing portion 150 is formed by collapsing the inner wall part 120 and the outer wall part 130, so that the strength of the container 110 is further increased.

Furthermore, an inner curved portion 125 curved so as to protrude toward the outer wall part 130 side is formed at a boundary portion between the inner wall part 120 configuring the annular flange portion 160 and the inner body portion 121. On the other hand, an outer curved portion 135 curved so as to protrude toward the inner wall part 120 side is formed at a boundary portion between the outer wall part 130 configuring the annular flange portion 160 and the outer body portion 131.

A gap d13 between the inner curved portion 125 and the outer curved portion 135 is narrower than gaps of the other portions of the annular flange portion 160. In this way, the strength of the container 110 is further increased.

The method for manufacturing the double-wall container 110 having such a shape may be the same as the method for manufacturing the double-wall container 10 according to the first embodiment. Namely, for example, the double-wall container 110 can be manufactured by the method described below.

Specifically, first, a predetermined preform is injection-molded by an injecting molding apparatus, and then, the preform is blown-molded to form an intermediate molded body.

As shown in FIG. 9A, first, a preform 1100 having a predetermined shape is formed by injection molding (injection molding process). The preform 1100 has a neck portion 1101, and a bottomed body portion 1102 continuous from the neck portion 1101. The neck portion 1101 is a portion that becomes the leg portion 132 of the double-wall container 110. Therefore, the neck portion 1101 is formed to have substantially the same shape (thickness, height, opening diameter, etc.) as the leg portion 132.

The shape of the body portion 1102 of the preform 1100 is not particularly limited. However, in the present embodiment, the body portion 1102 is relatively short and small, and is formed in a substantially tapered shape (a so-called bowl shape). That is, the body portion 1102 of the preform 1100 is formed so that the diameter at an end portion on the side of the neck portion 1101 is the largest and the diameter becomes smaller toward a bottom surface portion 1102*a* of the body portion 1102.

Subsequently, the preform 1100 is conveyed from the injection molding apparatus to the blow molding apparatus. When the body portion 1102 of the preform 1100 is blow-molded in a mold, an intermediate molded body 1200 having a predetermined shape is formed as shown in FIG. 9B (blow molding process). The intermediate molded body 1200 includes a neck portion 1201 that becomes the leg portion 132 of the container 110, an inner wall forming part 1202 that becomes the inner wall part 120 (the inner body portion 121 and the inner bottom portion 122) of the container 110, and an outer wall forming part 1203 that becomes the outer wall part 130 (the outer body portion 131). The neck portion 1201 of the intermediate molded body 1200 is a portion common to the neck portion 1101 of the preform 1100.

The outer wall forming part 1203 is formed continuously from the neck portion 1201, and the inner wall forming part 1202 is formed continuously on the side of the outer wall forming part 1203 opposite to the neck portion 1201. That is, the inner wall forming part 1202 is formed in a shape that bulges outward in a depth direction (a left and right direction in FIGS. 9A and 9B) of the outer wall forming part 1203. Namely, the intermediate molded body 1200 has a shape in which the inner wall part 120 of the container 110 is inverted outward on the side of the outer wall part 130 opposite to the leg portion 132.

Here, convex portions 1204 projecting outward in the radial direction of the inner wall forming part 1202 are formed at the portions of the inner wall forming part 1202 which become the engagement grooves 124 of the mounting portion 123. That is, the convex portion 1204 has a shape in which the engagement groove 124 of the container 110 is inverted outward in the radial direction of the inner wall forming part 1202.

Further, in the present embodiment, at the boundary portion between the inner wall forming part 1202 and the outer wall forming part 1203 (the portion corresponding to the peripheral edge of the opening 111*a*), a projection part 1205 projecting outward in the radial direction of the outer wall forming part 1203 is provided in the circumferential direction. That is, the inner wall forming part 1202 and the outer wall forming part 1203 are connected via the projection part 1205. The projection part 1205 is a portion that becomes the annular flange portion 160 (the reinforcing portion 150) of the container 110. Therefore, the projection part 1205 is formed in a shape (projecting amount) that matches the annular flange portion 160.

Furthermore, a first curved portion 1206 that becomes the inner curved portion 125 of the container 110 is formed at a boundary portion between the projection part 1205 and the inner wall forming part 1202. A second curved portion 1207 that becomes the outer curved portion 135 of the container 110 is formed at a boundary portion between the projection part 1205 and the outer wall forming part 1203. The first curved portion 1206 and the second curved portion 1207 are formed in curved surfaces that protrude toward the inside of the intermediate molded body 1200.

After such an intermediate molded body 1200 is formed, the intermediate molded body 1200 is conveyed from the blow molding apparatus to an inversion device, and the inner wall forming part 1202 is pressed by the inversion device and is inverted. In this way, the double-wall container 110 as a final product is formed (inverting process).

Here, as shown in FIG. 10, an inversion device 1300 according to the present embodiment includes an accommodating mold 1310, an annular pressing mold 1320, and a convex pressing mold 1330. The accommodating mold 1310 has an accommodating recessed portion 1311. The accommodating recessed portion 1311 is provided to open at one end surface of the accommodating mold 1310. The outer wall forming part 1203 and the neck portion 1201 of the intermediate molded body 1200 are accommodated in the accommodating recessed portion 1311.

The annular pressing mold 1320 is provided for collapsing the projection part 1205 of the intermediate molded body 1200 with the accommodating mold 1310 as described later. The annular pressing mold 1320 is provided in an annular shape to face an opening edge of the accommodating recessed portion 1311. Further, a through hole 1321 is formed in the portion of the annular pressing mold 1320 facing the accommodating recessed portion 1311. The annular pressing mold 1320 is configured to be movable in a depth direction of the intermediate molded body 1200 (the left and right direction in FIG. 10). That is, the annular pressing mold 1320 is configured to be movable in a direction approaching or away from the accommodating mold 1310.

The convex pressing mold 1330 is provided for pressing and inverting the inner wall forming part 1202. In other words, the convex pressing mold 1330 is a mold for forming the recessed portion 111 of the container 110. Similar to the annular pressing mold 1320, the convex pressing mold 1330 is configured to be movable in the depth direction of the intermediate molded body 1200 (the left and right direction in FIG. 10). More specifically, the convex pressing mold 1330 is configured to be inserted into the accommodating recessed portion 1311 through the through hole 1321 of the annular pressing mold 1320.

Further, in the present embodiment, the convex pressing mold 1330 is configured to be movable in the depth direction of the intermediate molded body 1200 (the left and right direction in FIG. 10) in a state where the projection part 1205 is collapsed by the annular pressing mold 1320 and the accommodating mold 1310 as described later.

In the present embodiment, the inner wall forming part 1202 of the intermediate molded body 1200 is inverted by the inversion device 1300 having such a configuration, thereby forming the double-wall container 110 as a final product.

First, as shown in FIG. 11A, the outer wall forming part 1203 and the neck portion 1201 of the intermediate molded body 1200 are accommodated in the accommodating recessed portion 1311 of the accommodating mold 1310. At this time, the projection part 1205 is in a state of projecting onto an end surface 1310*a* of the opening peripheral edge of the accommodating mold 1310.

In this state, as shown in FIG. 11B, the annular pressing mold 1320 is moved toward the accommodating mold 1310, and the projection part 1205 of the intermediate molded body 1200 is collapsed by the annular pressing mold 1320 and the accommodating mold 1310 (collapsing process).

In this way, the annular flange portion 160 of the container 110 is formed. Further, since the first curved portion 1206 and the second curved portion 1207 are formed to the convex portions 1204 as described above, the gap between the inner wall part 120 and the outer wall part 130 configuring the annular flange portion 160 can be made relatively narrower.

At that time, the projection part 1205 is preferably collapsed while being heated to a predetermined temperature (100° C. to 140° C.). That is, the inversion device 1300 preferably includes a temperature adjustment device that adjusts the projection part 1205 of the intermediate molded body 1200 to a predetermined temperature.

For example, the annular pressing mold 1320 is provided with a supply line (not shown) for supplying a temperature adjustment medium such as hot water or oil. The temperature (surface temperature) of the annular pressing mold 1320 can be adjusted by supplying the temperature adjustment medium into the supply line using a supply device (temperature adjustment device).

In a state where the annular pressing mold 1320 whose surface temperature has been adjusted is brought into contact with the projection part 1205, and the projection part 1205 is raised to a predetermined temperature, the projection part 1205 is collapsed by the annular pressing mold 1320 and the accommodating mold 1310.

The configuration of the temperature adjustment device is not particularly limited. For example, the temperature adjustment device may be a heater that heats the annular pressing mold 1320 or a heater that heats the projection part 1205 itself.

Subsequently, while maintaining the state in which the projection part 1205 is collapsed by the annular pressing mold 1320 and the accommodating mold 1310, as shown in FIG. 11C, the convex pressing mold 1330 is moved toward the accommodating mold 1310, and the inner wall forming part 1202 is pushed inside the accommodating recessed portion 1311 and is inverted. Namely, the inner wall forming part 1202 is pushed inside the outer wall forming part 1203 and is inverted (inverting process).

Specifically, when the convex pressing mold 1330 is moved toward the accommodating mold 1310, a tip surface of the convex pressing mold 1330 comes into contact with a bottom portion 1202*a* of the inner wall forming part 1202. As the bottom portion 1202*a* is pressed, a body portion 1202*b* of the inner wall forming part 1202 is deformed (inverted) and pushed inside the outer wall forming part 1203.

At that time, the convex portions 1204 are pressed by the convex pressing mold 1330 to be inverted, and the engagement grooves 124 are formed. In this way, the double-wall container 110 is formed in which the engagement grooves 124 are provided in the mounting portion 123, and the annular flange portion 160 (the reinforcing portion 150) is provided (see FIG. 6).

When the reinforcing portion 150 is provided in the double-wall container 110 (when the projection part 1205 is provided in the intermediate molded body 1200) as mentioned above, it is possible to suppress unfavorable deformation that may occur at the boundary portion between the inner wall forming part 1202 and the outer wall forming part 1203 during the inverting process, thereby improving formability. As a result, the double-wall container 110 having improved strength in the vicinity of the opening 111*a* can be manufactured. Namely, even in the manufacturing method including the inverting process, the double-wall container 110 including the mounting portion 123 (the opening 111*a*) to which the lid member 190 can be satisfactorily mounted can be molded.

When the inner wall forming part 1202 is inverted by the convex pressing mold 1330, the inner wall forming part 1202 may be adjusted to a predetermined temperature. For example, the inversion device 1300 may include a temperature adjustment device such as a heater that heats the inner wall forming part 1202.

Here, when the inner wall forming part 1202 is heated, it is preferable that the body portion 1202b of the inner wall forming part 1202 is heated and the bottom portion 1202a with which the convex pressing mold 1330 is in contact is not heated as much as possible. In this way, the inner wall forming part 1202 can be appropriately pressed by the convex pressing mold 1330, and the inner wall forming part 1202 can be satisfactorily inverted. At that time, the convex portion 1204 provided on the inner wall forming part 1202 can be satisfactorily inverted.

When the double-wall container 110 is manufacture by such a manufacturing method of the present embodiment, that is, when the intermediate molded body 1200 is inverted by the inversion device 1300 to manufacture the double-wall container 110, the manufacturing process of the double-wall container 110 can be simplified. Therefore, the manufacturing efficiency of the double-wall container 110 can be improved.

Further, in the above manufacturing method, the leg portion 132 of the double-wall container 110 is formed by injection molding, and the other portions are formed by blow molding. Therefore, the leg portion 132 is formed to be thicker than the other portions. In this way, it is possible to improve the stability when the double-wall container 110 is placed.

Third Embodiment

Figure 12:
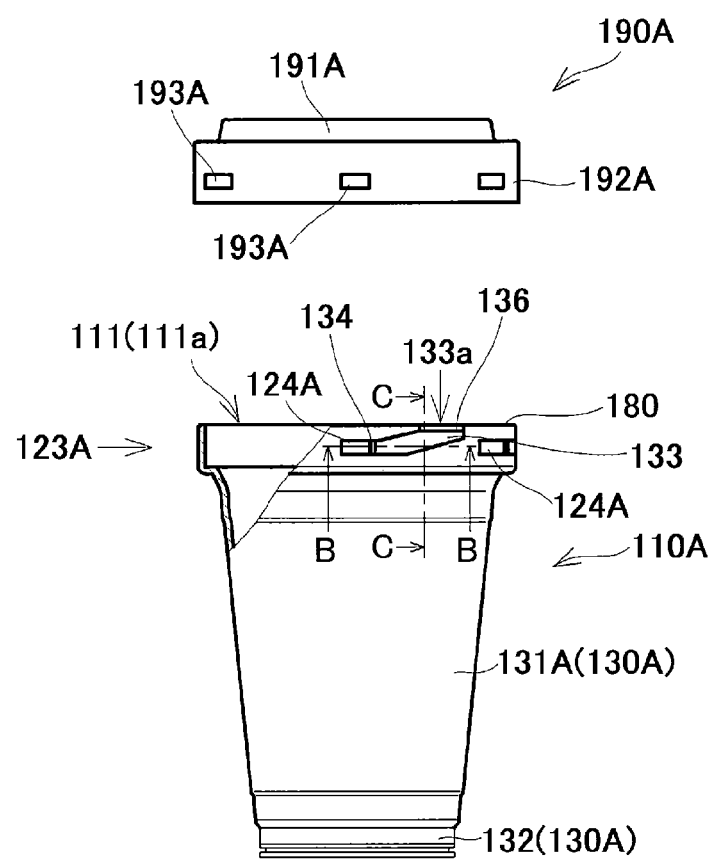
FIG. 12 is a front view of a double-wall container and a lid member according to a third embodiment of the disclosure.
Figure 13:
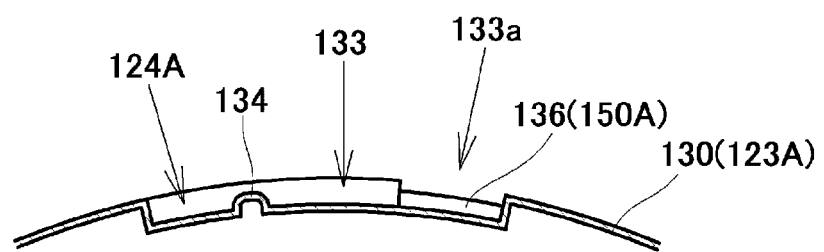
FIG. 13 is a partial sectional view of the double-wall container according to the third embodiment of the disclosure.
Figure 14:
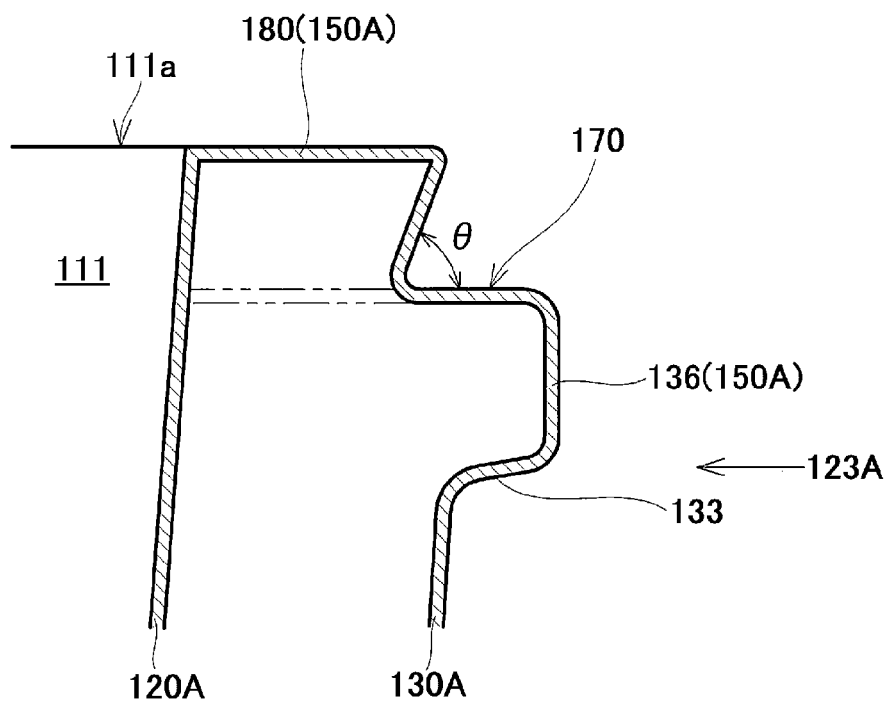
FIG. 14 is a partial sectional view of the double-wall container according to the third embodiment of the disclosure.
Figure 15A:
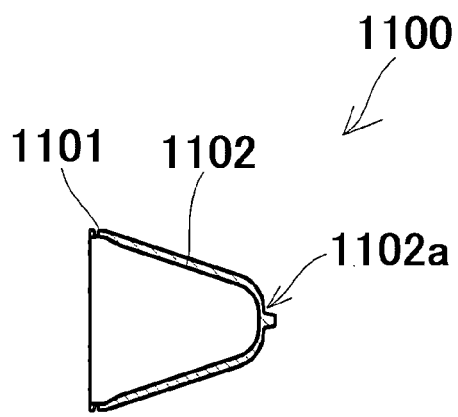
FIG. 15A is a view for explaining a method for manufacturing the double-wall container according to the third embodiment of the disclosure.
Figure 15B:
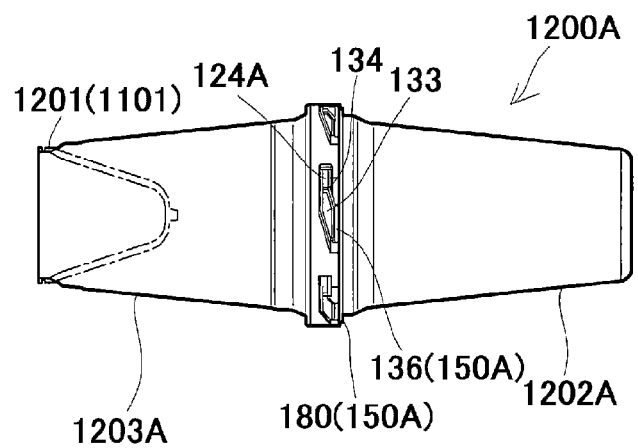
FIG. 15B is a view for explaining the method for manufacturing the double-wall container according to the third embodiment of the disclosure.
Figure 16:
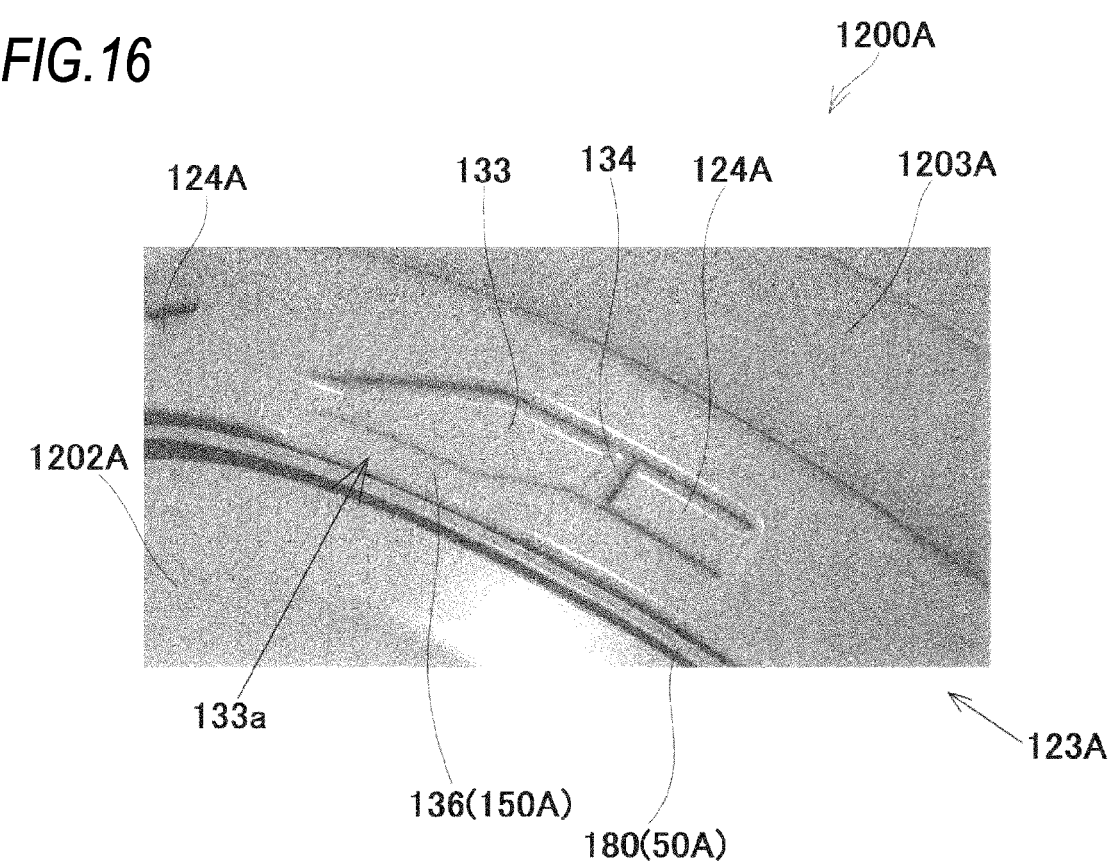
FIG. 16 is a view showing a shape of an intermediate molded body according to the third embodiment of the disclosure.

FIG. 12 is a front view showing a double-wall container and a lid member according to a third embodiment of the disclosure. FIG. 13 is a sectional view of the part corresponding to the line B-B in FIG. 12. FIG. 14 is a sectional view of the part corresponding to the line C-C in FIG. 12. Further, FIGS. 15A and 15B are views for explaining a method for manufacturing the double-wall container according to the third embodiment. FIG. 16 is a view showing a main part of an intermediate molded body. In each drawing, the same members as those in the second embodiment are denoted by the same reference numerals, and redundant description will be omitted.

As shown in FIGS. 12 to 14, a double-wall container 110A according to the present embodiment is configured so that a lid member 190A can be mounted to an outer peripheral surface side. Specifically, an outer body portion 131A of an outer wall part 130A is provided, at an end portion on the side of the opening 111a, with a mounting portion 123A to which the lid member 190A is mounted. The mounting portion 123A is a portion with which the lid member 190A slides into contact when mounted to the double-wall container 110A. The mounting portion 123A is formed in a substantially flat surface in the upper and lower direction of the container 110A. Further, a plurality of (e.g., six) engagement grooves 124A for fixing the lid member 190A to the container 110A are formed in the mounting portion 123A at predetermined intervals in the circumferential direction.

The lid member 190A is a so-called outer lid that is mounted to the outer wall part 130A of the double-wall container 110A. The lid member 190A includes a lid body 191A facing the opening 111a, and an annular vertical wall portion 192A provided on an outer peripheral portion of the lid body 191A and having an inner surface side facing the mounting portion 123A. The vertical wall portion 192A is provided with a plurality of engagement convex portions 193A projecting toward each engagement groove 124A (the inner side of the lid member 190A). The lid member 190A is fixed to the container 110A by engaging the plurality of engagement convex portions 193A with the engagement grooves 124A.

Further, the mounting portion 123A is provided with a guiding groove 133 extending from the end portion on the side of the opening 111a toward the engagement groove 124A. The guiding groove 133 is provided for guiding the engagement convex portion 193A to the engagement groove 124A when the engagement convex portion 193A of the lid member 190A is engaged with the engagement groove 124A. The guiding groove 133 is continuously formed to the side portion of the engagement groove 124A in the circumferential direction of the container 110A. Further, the guiding groove 133 is provided to open at an end surface on the side of the opening 111a. This opening portion serves as an entrance 133a for allowing the engagement convex portion 193A of the lid member 190A to enter the guiding groove 133.

A restriction protrusion 134 for restricting the movement of the engagement convex portion 193A engaged with the engagement groove 124A is provided at a boundary portion between the engagement groove 124A and the guiding groove 133. The restriction protrusion 134 extends in a height direction of the container 110A and is formed lower than the surface of the mounting portion 123A. In other words, the restriction protrusion 134 is formed at a height lower than the depth of the engagement groove 124A and the guiding groove 133.

By the way, in the second embodiment, the annular flange portion 160 is provided as the reinforcing portion 150 at the boundary portion between the inner wall part 120 and the outer wall part 130, but in the third embodiment, the inner wall part 120A and the outer wall part 130A of the container 110A are connected via a connecting portion 170 that forms an end surface on the side of the opening 111a (see FIG. 14). The connecting portion 170 is provided with an annular rib 180 that projects to a position spaced apart from an end portion on the side of the mounting portion 123A (an end portion on the side of the outer wall part 130A) and is continuous in the circumferential direction of the container 110A. The annular rib 180 is formed so that an angle θ of a corner formed by its side surface on the side of the outer wall part 130A and the surface of the connecting portion 170 is an acute angle.

Further, as described above, the guiding groove 133 is provided to open to the end surface on the side of the opening 111a, that is, toward the connecting portion 170. This opening portion serves as the entrance 133a for allowing the engagement convex portion 193A of the lid member 190A to enter the guiding groove 133.

A reinforcing rib 136 extending in the circumferential direction of the container 110A is provided at the entrance 133a of the guiding groove 133. The reinforcing rib 136 functions, together with the annular rib 180, as a reinforcing portion 150A for reinforcing the mounting portion 123A. The reinforcing rib 136 is formed lower than the surface of the mounting portion 123A, similarly to the restriction protrusion 134. Namely, the reinforcing rib 136 is formed at a height lower than the depth of the guiding groove 133. The height of the reinforcing rib 136 may be constant, but may be lower as the distance from the engagement groove 124A increases.

Further, although, in the present embodiment, the reinforcing rib 136 is continuously provided between both side surfaces of the guiding groove 133 (see FIG. 13), the shape of the reinforcing rib 136 is not particularly limited. For example, the reinforcing rib 136 may be intermittently provided between both side surfaces of the guiding groove 133.

Since the reinforcing portion 150A including the annular rib 180 and the reinforcing rib 136 is provided, the strength of the container 110A, in particular, the strength in the vicinity of the mounting portion 123A is increased. In particular, since the angle θ of the corner formed by the side surface of the annular rib 180 on the side of the outer wall part 130A and the surface of the connecting portion 170 is an acute angle, the strength in the vicinity of the mounting portion 123A is further increased.

In this way, even when the plurality of engagement grooves 124A and the guiding grooves 133 are formed in the mounting portion 123A, sufficient strength is ensured in the vicinity of the mounting portion 123A including the peripheral edge of the opening 111a. Therefore, for example, even when a beverage or the like is contained in the container 110A, the deformation of the container 110A is suppressed.

When the lid member 190A is mounted to the container 110A having such a shape, first, the engagement convex portion 193A of the lid member 190A enters the guiding groove 133 from the entrance 133a of the guiding groove 133. That is, the engagement convex portion 193A gets over the reinforcing rib 136 and enters the guiding groove 133. As described above, the reinforcing rib 136 is formed lower than the depth of the guiding groove 133. Therefore, the engagement convex portion 193A can be relatively easily entered into the guiding groove 133.

In this state, when the lid member 190A and the container 110A are relatively rotated, the engagement convex portion 193A moves along the guiding groove 133 and comes into contact with the restriction protrusion 134. Thereafter, when the lid member 190A and the container 110A are further relatively rotated, the engagement convex portion 193A gets over the restriction protrusion 134 and engages with the engagement groove 124A.

As described above, the restriction protrusion 134 is formed lower than the depth of the guiding groove 133 and the engagement groove 124A. Therefore, the engagement convex portion 193A gets over the restriction protrusion 134 without coming off the guiding groove 133 and satisfactorily engages with the engagement groove 124A.

Similar to the second embodiment, also in the container 110A according to the third embodiment, as shown in FIG. 15A, first, the preform 1100 having a predetermined shape is formed by injection molding (injection molding process). Subsequently, as shown in FIG. 15B, an intermediate molded body 1200A having a predetermined shape is formed by blow-molding the body portion 1102 of the preform 1100.

An outer wall forming part 1203A of the intermediate molded body 1200A is formed in the same shape as the outer wall part 130A of the container 110A. That is, as shown in the enlarged view of FIG. 16, in the outer wall forming part 1203A of the intermediate molded body 1200A, the engagement groove 124A and the guiding groove 133 are formed, and the restriction protrusion 134 and the reinforcing rib 136 are also formed. Furthermore, in the intermediate molded body 1200A, the annular rib 180 is already formed at the boundary portion between the outer wall forming part 1203A and an inner wall forming part 1202A. Namely, the intermediate molded body 1200A already includes the reinforcing portion 150A having the annular rib 180 and the reinforcing rib 136.

The intermediate molded body 1200A including the reinforcing portion 150A is conveyed from the blow molding apparatus to the inversion device, and the inner wall forming part 1202A is pressed by the inversion device and is inverted, so that the double-wall container 110A as a final product is formed (inverting process).

When the strength at the boundary portion between the inner wall forming part 1202A and the outer wall forming part 1203A is low, the inner wall forming part 1202A may not be satisfactorily inverted by the inverting process. For example, there is a possibility that wrinkles may be formed in the vicinity of the boundary between the inner wall forming part 1202A and the outer wall forming part 1203A.

However, in the intermediate molded body 1200A according to the present embodiment, the reinforcing portion 150A including the annular rib 180 and the reinforcing rib 136 is already formed, and the strength at the boundary portion between the inner wall forming part 1202A and the outer wall forming part 1203A is increased. Therefore, the inner wall forming part 1202A can be satisfactorily inverted by the inverting process.

When the reinforcing portion 150A (the annular rib 180 and the reinforcing rib 136) is provided in the double-wall container 110A and the intermediate molded body 1200A as described above, it is possible to suppress unfavorable deformation that may occur at the boundary portion between the inner wall forming part 1202A and the outer wall forming part 1203A during the inverting process, thereby improving formability. As a result, the double-wall container 110A that has improved strength in the vicinity of the opening 111a and has a flat top surface of the opening 111a can be manufactured. Namely, even in the manufacturing method including the inverting process, the double-wall container 110A including the mounting portion 123A (the opening 111a) to which the lid member 190A can be satisfactorily mounted can be molded.

Although the embodiments of the disclosure have been described above, the disclosure is not limited to the above-described embodiments.

For example, although an example in which the double-wall container 10 includes the annular flange portion 60, and the annular flange portion 60 is configured by the collapsed portion 50 has been described in the first embodiment, the double-wall container 10 does not necessarily need to include the annular flange portion 60. Even when the double-wall container 10 does not include the annular flange portion 60, the strength of the double-wall container 10 is improved when the collapsed portion 50 is provided at the opening edge portion of the recessed portion 11.

For example, although an example in which the inverting process is performed in a state where the projection part 1205 of the intermediate molded body 1200 is collapsed by the annular pressing mold 1320 and the accommodating mold 1310 has been described in the second embodiment, the disclosure is not limited to this example. For example, the inverting process may be performed in a state where the collapsing of the projection part 1205 is released. Namely, when the projection part 1205 is already sufficiently collapsed, the state in which the projection part 1205 is collapsed by the annular pressing mold 1320 and the accommodating mold 1310 does not necessarily need to be maintained when the inverting process is performed.

Further, the injection molding apparatus and the blow molding apparatus may have an independent configuration (two-stage molding apparatus) or may have an integrated configuration (one-stage molding apparatus). Furthermore, the inversion device may be configured either independently or integrally with the blow molding apparatus.

This application appropriately incorporates the contents disclosed in Japanese Patent Applications (Patent Application Nos. 2018-155815 and 2018-155816) filed on Aug. 22, 2018 and Japanese Patent Application (Patent Application No. 2018-168258) filed on Sep. 7, 2018.

The invention claimed is:

1. An inversion device used in a method for manufacturing a double-wall container, the inversion device comprising:
   an accommodating mold having an accommodating recessed portion which has an opening at one end surface of the accommodating mold, the opening being formed at an outermost edge of the accommodating recessed portion, and in which an outer wall forming part of an intermediate molded body of the double-wall container, including an inner wall forming part and the outer wall forming part, is accommodated in a state where a projection part that is provided at a boundary portion between the inner wall forming part and the outer wall forming part and protrudes from the intermediate molded body in a radial direction of the intermediate molded body projects onto the one end surface of the accommodating mold;
   an annular pressing mold with two open ends, provided in an annular shape at, and aligned with, the outermost edge of the accommodating recessed portion, configured to be movable in a depth direction of the intermediate molded body, and configured to fix the position of the projection part of the intermediate molded body by pressing the projection part of the intermediate molded body against the one end surface of the accommodating mold in a state where the inner wall forming part is located at a radially inner region of the annular pressing mold; and
   a convex pressing mold configured to be movable in the depth direction of the intermediate molded body through the open ends of the annular pressing mold, and configured to press, in the state in which the annular pressing mold is pressing the projection part against the one end surface of the accommodating mold, an inner wall forming part of the intermediate molded body from a bottom portion side thereof to push the inner wall forming part inside the outer wall forming part and invert the inner wall forming part to form the double-wall container with a collapsed projection part.

2. The inversion device according to claim 1, wherein the convex pressing mold is configured to be movable in the depth direction of the intermediate molded body in a state where the projection part is collapsed by the annular pressing mold and the accommodating mold.

3. The inversion device according to claim 1, further comprising a temperature adjustment device that adjusts the projection part of the intermediate molded body to a predetermined temperature.

4. The inversion device according to claim 3, wherein the temperature adjustment device adjusts the temperature of the annular pressing mold.

* * * * *